(12) United States Patent
Ji et al.

(10) Patent No.: US 12,418,891 B2
(45) Date of Patent: Sep. 16, 2025

(54) FEEDBACK INFORMATION TRANSMISSION METHOD AND APPARATUS, DEVICE, AND MEDIUM

(71) Applicant: VIVO MOBILE COMMUNICATION CO., LTD., Guangdong (CN)

(72) Inventors: Zichao Ji, Guangdong (CN); Xueming Pan, Guangdong (CN); Huaming Wu, Guangdong (CN); Siqi Liu, Guangdong (CN); Shixiao Liu, Guangdong (CN); Shuyan Peng, Guangdong (CN); Wei Jiang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 455 days.

(21) Appl. No.: 17/667,757

(22) Filed: Feb. 9, 2022

(65) Prior Publication Data
US 2022/0272666 A1    Aug. 25, 2022

Related U.S. Application Data

(63) Continuation of application No. PCT/CN2020/107123, filed on Aug. 5, 2020.

(30) Foreign Application Priority Data

Aug. 9, 2019  (CN) .......................... 201910736176.6

(51) Int. Cl.
*H04W 72/02*  (2009.01)
*H04L 1/1812*  (2023.01)
(Continued)

(52) U.S. Cl.
CPC .......... *H04W 72/02* (2013.01); *H04L 1/1812* (2013.01); *H04L 5/0053* (2013.01); *H04W 72/0473* (2013.01); *H04W 72/542* (2023.01)

(58) Field of Classification Search
CPC .............. H04W 72/02; H04W 72/542; H04W 72/0473; H04L 1/1812; H04L 5/0053
See application file for complete search history.

(56) References Cited

U.S. PATENT DOCUMENTS 10,491,289 B2 * 11/2019 Han .................... H04B 7/15528
10,785,753 B1 *  9/2020 Li ......................... H04L 5/0044
(Continued)

FOREIGN PATENT DOCUMENTS

CN     102638879 A    8/2012
CN     108322414 A    7/2018
(Continued)

OTHER PUBLICATIONS

Panasonic, "Discussion on physical layer procedures for sidelink in NR V2X", 3GPP TSG RAN WG1 #97, R1-1906404, Reno, USA, May 13-17, 2019.
(Continued)

*Primary Examiner* — Blake J Rubin
(74) *Attorney, Agent, or Firm* — Price Heneveld LLP

(57) ABSTRACT

A feedback information transmission method and apparatus, a device, and a medium are provided. The method includes: receiving at least one piece of transmission information transmitted on at least one physical sidelink channel, where one piece of transmission information is transmitted on each physical sidelink channel; determining power information corresponding to each of at least one piece of feedback information that corresponds to the at least one piece of transmission information; and transmitting corresponding feedback information on at least one physical sidelink feedback channel resource based on the power information corresponding to each piece of feedback information.

18 Claims, 4 Drawing Sheets

(51) Int. Cl.
*H04L 5/00* (2006.01)
*H04W 72/044* (2023.01)
*H04W 72/542* (2023.01)

(56) References Cited

U.S. PATENT DOCUMENTS

| | | | |
|---|---|---|---|
| 12,167,372 B2 * | 12/2024 | Park | H04L 1/08 |
| 2004/0097253 A1 | 5/2004 | Malkamaki | |
| 2012/0207107 A1 | 8/2012 | Li et al. | |
| 2016/0165619 A1 | 6/2016 | Mcmilin et al. | |
| 2019/0327724 A1 | 10/2019 | Zhao | |
| 2020/0196255 A1 * | 6/2020 | Cheng | H04L 5/0092 |
| 2020/0205083 A1 * | 6/2020 | Chen | H04W 52/367 |
| 2020/0205089 A1 * | 6/2020 | Kim | H04W 52/365 |
| 2020/0205165 A1 * | 6/2020 | Huang | H04L 1/1854 |
| 2020/0205166 A1 * | 6/2020 | Huang | H04L 5/0055 |
| 2020/0266857 A1 * | 8/2020 | Hwang | H04L 1/1864 |
| 2020/0328852 A1 | 10/2020 | Tang et al. | |
| 2020/0329437 A1 * | 10/2020 | MolavianJazi | H04W 76/15 |
| 2020/0344574 A1 * | 10/2020 | Park | H04L 1/0072 |
| 2020/0351032 A1 | 11/2020 | Wu et al. | |
| 2020/0359375 A1 * | 11/2020 | Hwang | H04L 1/1854 |
| 2020/0383096 A1 | 12/2020 | Yang et al. | |
| 2020/0413348 A1 * | 12/2020 | Ryu | H04W 48/12 |
| 2021/0028910 A1 * | 1/2021 | Cheng | H04L 5/0064 |
| 2021/0120564 A1 * | 4/2021 | Lee | H04W 4/40 |
| 2021/0168648 A1 * | 6/2021 | Lee | H04B 17/318 |
| 2021/0288778 A1 * | 9/2021 | Park | H04L 1/1854 |
| 2021/0314109 A1 | 10/2021 | Zhao | |
| 2021/0377911 A1 * | 12/2021 | Zhao | H04W 72/0453 |
| 2021/0410084 A1 * | 12/2021 | Li | H04W 52/265 |
| 2022/0038217 A1 * | 2/2022 | Yoshioka | H04L 1/1819 |
| 2022/0095279 A1 * | 3/2022 | Hwang | H04L 27/2602 |
| 2022/0109546 A1 * | 4/2022 | Panteleev | H04L 5/0053 |
| 2022/0201654 A1 * | 6/2022 | Lee | H04W 72/20 |
| 2022/0210743 A1 * | 6/2022 | Yi | H04L 1/1812 |
| 2022/0217657 A1 * | 7/2022 | Hong | H04L 5/00 |
| 2022/0248425 A1 * | 8/2022 | Lee | H04W 72/1263 |
| 2022/0256357 A1 * | 8/2022 | Kim | H04W 72/12 |
| 2022/0256507 A1 * | 8/2022 | Yoshioka | H04W 92/18 |
| 2022/0256535 A1 * | 8/2022 | Horiuchi | H04L 5/0033 |
| 2022/0278882 A1 * | 9/2022 | Back | H04L 27/2614 |
| 2022/0303952 A1 * | 9/2022 | Hoang | H04W 72/542 |
| 2022/0337355 A1 * | 10/2022 | Do | H04L 5/0055 |

FOREIGN PATENT DOCUMENTS

| | | |
|---|---|---|
| CN | 109075921 A | 12/2018 |
| CN | 109802787 A | 5/2019 |
| EP | 3242515 B1 | 4/2019 |
| JP | 2009105979 A | 5/2009 |
| JP | 2018502494 A | 1/2018 |
| JP | 2022533031 A | 7/2022 |
| WO | 2019019184 A1 | 1/2019 |
| WO | 2019028709 A | 2/2019 |
| WO | 2019128261 A1 | 7/2019 |
| WO | 2020222560 A1 | 11/2020 |

OTHER PUBLICATIONS

Samsung, "On Physical Layer Procedures for NR V2X", 3GPP TSG RAN WG1 #96bis, R1-1904426, Xi'an, China, Apr. 8-12, 2019.

Oppo, "Left issues on target scenario for NR-V2X", 3GPP TSG-RAN WG2 Meeting #105, R2-1900178, Athens, Greece, Feb. 25-Mar. 1, 2019.

LG Electronics, "Discussion on physical layer procedures for NR sidelink", 3GPP TSG RAN WG1 Meeting #100, R1-2000785, e-Meeting, Feb. 24-Mar. 5, 2020.

LG Electronics, "Discussion on physical layer procedures for NR sidelink", 3GPP TSG RAN WG1 Meeting #97, R1-1907018, Reno, USA, May 13-17, 2019.

* cited by examiner

FEEDBACK INFORMATION TRANSMISSION METHOD AND APPARATUS, DEVICE, AND MEDIUM

CROSS-REFERENCE TO RELATED APPLICATIONS

This application is a continuation application of PCT International Application No. PCT/CN2020/107123 filed on Aug. 5, 2020, which claims priority to Chinese Patent Application No. 201910736176.6, filed on Aug. 9, 2019 in China, which are incorporated in their entireties by reference herein.

TECHNICAL FIELD

This disclosure relates to the field of mobile communications technologies, and in particular, to a feedback information transmission method and apparatus, a device, and a medium.

BACKGROUND

New radio (NR) vehicle to everything (vehicle to X, V2X) supports sidelink (SL) hybrid automatic repeat request (HARQ), where HARQ is carried on a physical sidelink shared channel (PSSCH) or a physical sidelink control channel (PSCCH). After receiving the HARQ transmitted on the PSSCH or PSCCH, a terminal device returns corresponding feedback information, which is carried on a physical sidelink feedback channel (PSFCH).

SL supports unicast, multicast, and broadcast. For multicast transmission, there are two feedback manners. In a first feedback manner, all receive ends share a PSFCH resource, and the receive ends feed back only negative acknowledgments. In a second feedback manner, the receive ends occupy different PSFCH resources, and the receive ends feed back acknowledgments or negative acknowledgments on their respective PSFCH resources occupied.

SUMMARY

According to one aspect, an embodiment of this disclosure provides a feedback information transmission method, including:
  receiving at least one piece of transmission information transmitted on at least one physical sidelink channel, where one piece of transmission information is transmitted on each physical sidelink channel;
  determining power information corresponding to each of at least one piece of feedback information that corresponds to the at least one piece of transmission information; and
  transmitting corresponding feedback information on at least one PSFCH resource based on the power information corresponding to each piece of feedback information.

According to another aspect, an embodiment of this disclosure provides a feedback information transmission apparatus, including:
  a receiving module, configured to receive at least one piece of transmission information transmitted on at least one physical sidelink channel, where one piece of transmission information is transmitted on each physical sidelink channel;
  a determining module, configured to determine power information corresponding to each of at least one piece of feedback information that corresponds to the at least one piece of transmission information; and
  a transmission module, configured to transmit corresponding feedback information on at least one PSFCH resource based on the power information corresponding to each piece of feedback information.

According to still another aspect, an embodiment of this disclosure provides a terminal device, including: a processor, a memory, and a computer program stored on the memory and capable of running on the processor. When the computer program is executed by the processor, steps of a feedback information transmission method provided in an embodiment of this disclosure are implemented.

According to yet another aspect, an embodiment of this disclosure provides a computer-readable storage medium, and the computer-readable storage medium stores a computer program. When the computer program is executed by a processor, steps of a feedback information transmission method provided in an embodiment of this disclosure are implemented.

BRIEF DESCRIPTION OF DRAWINGS

To describe the technical solutions in the embodiments of this disclosure more clearly, the following briefly describes the accompanying drawings required in the embodiments of this disclosure. A person of ordinary skill in the art may still derive other drawings from these accompanying drawings.

DETAILED DESCRIPTION OF EMBODIMENTS

To make the invention objectives, technical solutions, and advantages of this disclosure clearer, the following describes this disclosure in detail with reference to specific embodiments. It should be understood that the embodiments described in this specification are only for the purpose of explaining this disclosure, instead of limiting this disclosure.

For convenience, only some numerical ranges are explicitly disclosed herein. However, any lower limit may be combined with any upper limit to form an unspecified range; and any lower limit may be combined with another lower limit to form an unspecified range. Similarly, any upper limit may be combined with any other upper limit to form an unspecified range. In addition, although not explicitly specified, each point or single value between the endpoints of a range is included in the range. Therefore, each point or single value may be used as a lower limit or upper limit thereof and combined with any other point or single value to form an unspecified range, or each point or single value may be combined with any other lower limit or upper limit to form an unspecified range.

In the description herein, it should be noted that, unless otherwise specified, "at least" and "less than or equal to" are inclusive of the number, and "more" in "one or more" means at least two.

The above summary of this disclosure is not intended to describe every disclosed embodiment or every implementation in this disclosure. The following description illustrates example implementations in more detail. In many places throughout the application, the teaching is provided through a series of embodiments, which can be used in various combinations. In each instance, enumeration is only a representative group and should not be construed as exhaustive.

Embodiments of this disclosure provide a feedback information transmission method and apparatus, a device, and a medium. The following first describes a feedback information transmission method provided in an embodiment of this disclosure.

The feedback information transmission method provided in this embodiment of this disclosure may be applied to a terminal device transmitting data through a physical sidelink channel. For example, a HARQ is received through a PSSCH or a PSCCH, and feedback information corresponding to the HARQ is fed back through a PSFCH.

Figure 1:
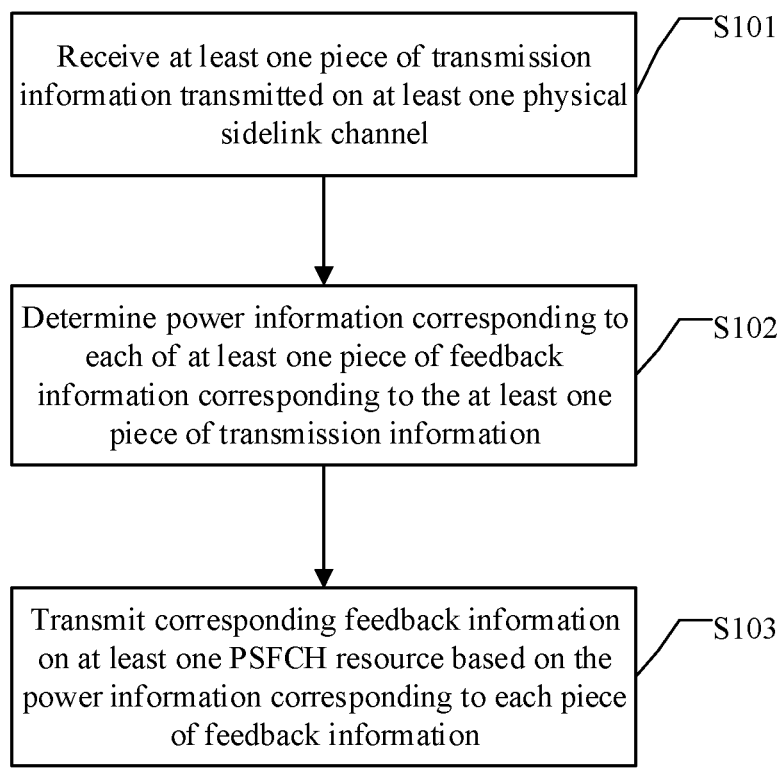
FIG. 1 is a first schematic flowchart of a feedback information transmission method according to an embodiment of this disclosure.

FIG. 1 is a first schematic flowchart of a feedback information transmission method according to an embodiment of this disclosure. The feedback information transmission method includes the following steps.

S101: Receive at least one piece of transmission information transmitted on at least one physical sidelink channel.

One piece of transmission information is transmitted on each physical sidelink channel.

In an embodiment of this disclosure, the physical sidelink channel may include a PSSCH and/or a PSCCH.

For example, a quantity of the at least one physical sidelink channel is 3, and the three physical sidelink channels may all be PSSCHs; or the three physical sidelink channels may all be PSCCHs; or the three physical sidelink channels may be: one PSSCH and two PSCCHs; or the three physical sidelink channels may be: two PSSCHs and one PSCCH.

In other words, the at least one physical sidelink channel in this embodiment of this disclosure may all be PSSCHs or PSCCHs, or may be some PSSCHs and some PSCCHs.

The transmission information transmitted on each physical sidelink channel in this embodiment of this disclosure refers to data transmitted on the physical sidelink channel.

S102: Determine power information corresponding to each of at least one piece of feedback information that corresponds to the at least one piece of transmission information.

In an embodiment of this disclosure, the power information corresponding to the feedback information is power information of a PSFCH resource carrying the feedback information.

S103: Transmit corresponding feedback information on at least one PSFCH resource based on the power information corresponding to each piece of feedback information.

In an embodiment of this disclosure, the power information may be a transmit power, a transmit power spectrum, or a power spectral density (PSD).

According to the feedback information transmission method in this embodiment of this disclosure, the power information corresponding to each of the at least one piece of feedback information that corresponds to the at least one piece of transmission information is determined; and the corresponding feedback information is transmitted on the at least one PSFCH resource based on the power information corresponding to each piece of feedback information, so that the corresponding feedback information can be transmitted based on the power information corresponding to each piece of feedback information.

In the following, that the power information is a transmit power is used as an example for description.

In an embodiment of this disclosure, it may be determined that a transmit power corresponding to each piece of feedback information is a preset transmit power.

For example, it is assumed that the preset transmit power is 1 watt (W). Then, the transmit power corresponding to each piece of feedback information is 1 W.

In an embodiment of this disclosure, it may be determined that the transmit power corresponding to each piece of feedback information is an arithmetic mean of a total transmit power divided by a quantity of feedback information.

For example, assuming that there are 10 pieces of feedback information, and a total transmit power is 20 W, an arithmetic mean of the total transmit power is 20 W/10=2 W. Then, it is determined that a transmit power corresponding to each piece of feedback information is 2 W.

In an embodiment of this disclosure, a transmit power corresponding to each piece of feedback information may be determined based on first attribute information. The first attribute information may include any one of the following: channel state information (CSI) of a monitored link, a reference signal received power (RSRP) of the monitored link, a distance to a device transmitting the transmission information, and a location of the device transmitting the transmission information.

For example, the distance to the device transmitting the transmission information is used as an example for description.

It is assumed that a correspondence between the distance to the device transmitting the transmission information and the transmit power corresponding to the feedback information is predefined. For example, if the distance to the device transmitting the transmission information is within 1 kilometer, a transmit power corresponding to the corresponding feedback information is x decibels relative to one milliwatt (decibel relative to one milliwatt, dBm); if the distance to the device transmitting the transmission information is within a range of 1 kilometer to 2 kilometers, a transmit power corresponding to the corresponding feedback information is x+y dBm; if the distance to the device transmitting the transmission information is within a range of 2 kilometers to 3 kilometers, a transmit power corresponding to the corresponding feedback information is x+2y dBm; . . . . In other words, the transmit power is increased by y dBm for every specific increase in the distance range.

After the transmission information is received, the distance to the device transmitting the transmission information is determined; and then the transmit power corresponding to the feedback information that corresponds to the transmission information is determined based on the correspondence between the distance to the device transmitting the transmission information and the transmit power corresponding to the feedback information.

In an embodiment of this disclosure, the transmit power corresponding to each piece of feedback information may be determined based on second attribute information of the transmission information. The second attribute information may include any one of the following: quality of service (QoS), a priority, a modulation and coding scheme (MCS), a size of a resource occupied, and a quantity of layers.

For example, a priority of the transmission information is used as an example for description.

It is assumed that a correspondence between the priority of the transmission information and the transmit power corresponding to the feedback information is predefined. For example, a transmit power corresponding to feedback information that corresponds to transmission information of a first priority is x dBm; a transmit power corresponding to feedback information that corresponds to transmission information of a second priority is x+y dBm; a transmit power corresponding to feedback information that corresponds to transmission information of a third priority is x+2y dBm; . . . . In other words, the transmit power is increased by y dBm for every corresponding increase of one priority.

After the transmission information is received, the priority of the transmission information is determined; and then the transmit power corresponding to the feedback information that corresponds to the transmission information is determined based on the correspondence between the priority of the transmission information and the transmit power corresponding to the feedback information.

In an embodiment of this disclosure, the transmit power corresponding to each piece of feedback information may be determined based on a transmission mode for transmitting the transmission information. The transmission mode may include: transmitting the transmission information using a beam, and transmitting the transmission information without using a beam.

For example, it is assumed that a correspondence between the transmission mode and the transmit power corresponding to the feedback information is predefined. For example, a transmit power corresponding to feedback information that corresponds to transmission using a beam is x dBm; and a transmit power corresponding to feedback information that corresponds to transmission without using a beam is x+y dBm.

After the transmission information is received, it is determined whether the transmission information is transmitted using a beam. If it is determined that the transmission information is transmitted using a beam, a transmit power corresponding to feedback information that corresponds to the transmission information is determined to be x dBm; if it is determined that the transmission information is transmitted without using a beam, a transmit power corresponding to feedback information that corresponds to the transmission information is determined to be x+y dBm.

In an embodiment of this disclosure, the transmit power corresponding to each piece of feedback information may be determined based on a transmission type of the at least one piece of transmission information.

The transmission type in this embodiment of this disclosure may include: unicast, multicast based on a first feedback manner, and multicast based on a second feedback manner. For multicast based on the first feedback manner, all receiving devices share a PSFCH resource, and the receiving devices feed back only negative acknowledgments (NACKs). For multicast based on the second feedback manner, the receiving devices occupy different PSFCH resources, and feed back acknowledgments (ACKs) or NACKs on their respective PSFCH resources occupied.

It is assumed that a correspondence between the transmission type of the transmission information and the transmit power corresponding to the feedback information is predefined. For example, a transmit power corresponding to unicast is x dBm; a transmit power corresponding to multicast based on the first feedback manner is x−y dBm; and a transmit power corresponding to multicast based on the second feedback manner is x dBm.

After the transmission information is received, the transmission type of the transmission information is determined; and then the transmit power corresponding to the feedback information that corresponds to the transmission information is determined based on the correspondence between the transmission type of the transmission information and the transmit power corresponding to the feedback information.

In an embodiment of this disclosure, the transmit power corresponding to each piece of feedback information may be determined based on a priority corresponding to the transmission type of the at least one piece of transmission information.

For example, a priority corresponding to unicast is higher than a priority corresponding to multicast based on the second feedback manner, and the priority corresponding to multicast based on the second feedback manner is a higher than a priority corresponding to multicast based on the first feedback manner. A transmit power corresponding to the lowest priority is x dBm, and a transmit power difference corresponding to two adjacent priorities is y dBm.

After the transmission information is received, the transmission type of the transmission information is determined; and then the transmit power corresponding to the feedback information that corresponds to the transmission information is determined based on the priority relationship and the transmit power difference.

In an embodiment of this disclosure, the transmit power corresponding to each piece of feedback information may be determined based on a PSFCH format corresponding to each piece of feedback information.

The PSFCH format is not limited in this embodiment of this disclosure, and any available PSFCH format may be applied to this embodiment of this disclosure.

For example, it is assumed that a correspondence between the PSFCH format and the transmit power corresponding to the feedback information is predefined. For example, a transmit power corresponding to a first PSFCH format is 1 W, a transmit power corresponding to a second PSFCH format is 2 W, and a transmit power corresponding to a third PSFCH format is 3 W.

After the transmission information is received, the PSFCH format of the feedback information corresponding to the transmission information is determined; and then the transmit power corresponding to the feedback information that corresponds to the transmission information is determined based on the correspondence between the PSFCH format and the transmit power corresponding to the feedback information. Assuming that the PSFCH format of the feedback information corresponding to the transmission information is the second PSFCH format, it is determined that the transmit power corresponding to the feedback information that corresponds to the transmission information is 2 W.

In an embodiment of this disclosure, the transmit power corresponding to each piece of feedback information may be determined based on a priority of the PSFCH format corresponding to each piece of feedback information.

For example, a priority of the first PSFCH format is higher than a priority of the second PSFCH format, and the priority of the second PSFCH format is higher than a priority of the third PSFCH format. A transmit power corresponding to the lowest priority is x dBm, and a transmit power difference corresponding to two adjacent priorities is y dBm.

After the transmission information is received, the PSFCH format corresponding to the feedback information that corresponds to the transmission information is determined; and then the transmit power corresponding to the feedback information that corresponds to the transmission information is determined based on the priority relationship and the transmit power difference.

In an embodiment of this disclosure, if a receiving device needs to transmit different information on a plurality of PSFCH resources simultaneously, for example, if the receiving device performs feedback on a plurality of PSCCH or PSSCH transmissions simultaneously, and transmits CSI corresponding to a plurality of transmitting devices simultaneously, power information of the receiving device on different resources is the same, or the corresponding power information is determined based on QoS, a priority, an MCS, a size of a resource occupied, a quantity of layers, and a transmission mode (whether a transmission uses a beam) that are of transmission information received from the plurality of transmitting devices; or CSI of a monitored link, an RSRP of the monitored link, distances from the plurality of transmitting devices, locations of the plurality of transmitting devices, and the like.

In an embodiment of this disclosure, before the determining power information corresponding to each of at least one piece of feedback information that corresponds to the at least one piece of transmission information, the feedback information transmission method provided in this embodiment of this disclosure may further include: determining feedback information for which transmission needs to be dropped, until a transmit power of a transmitting device can support the quantity of feedback information transmitted by the transmitting device simultaneously.

The determining power information corresponding to each of at least one piece of feedback information that corresponds to the at least one piece of transmission information may include: determining power information corresponding to each piece of feedback information for which transmission has not been dropped.

Figure 2:
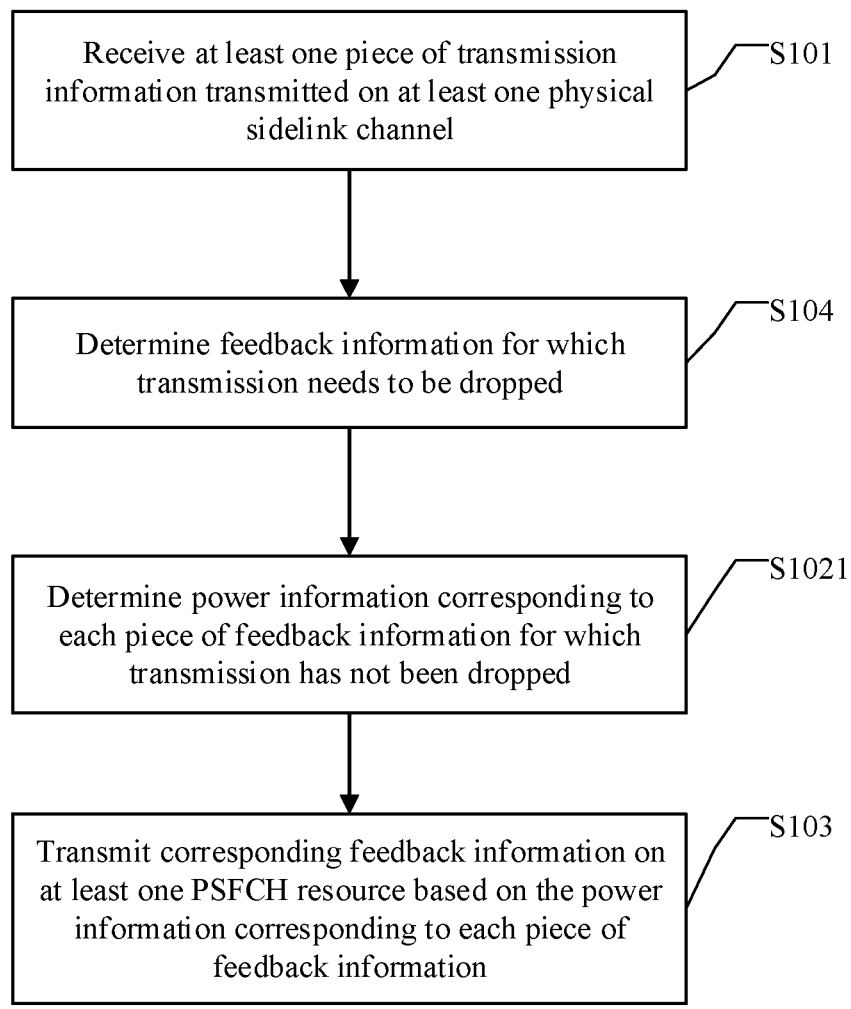
FIG. 2 is a second schematic flowchart of a feedback information transmission method according to an embodiment of this disclosure.

As shown in FIG. 2, FIG. 2 is a second schematic flowchart of a feedback information transmission method according to an embodiment of this disclosure. The embodiment shown in FIG. 2 of this disclosure adds, based on the embodiment shown in FIG. 1, S104 before S102, where S104 is: determining feedback information for which transmission needs to be dropped. S102 may include S1021: determining power information corresponding to each piece of feedback information for which transmission has not been dropped.

In this embodiment of this disclosure, the power information corresponding to each piece of feedback information for which transmission has not been dropped may be determined by using the foregoing method for determining the power information. For details, refer to the foregoing method for determining the power information, and details are not described herein in this embodiment of this disclosure.

In the following, that the power information is a transmit power is still used as an example for description.

In an embodiment of this disclosure, the feedback information for which transmission needs to be dropped may be randomly selected.

In an embodiment of this disclosure, the feedback information for which transmission needs to be dropped may be determined based on third attribute information. The third attribute information includes any one of the following: CSI of a monitored link, an RSRP of the monitored link, a distance to a device transmitting the transmission information, and a location of the device transmitting the transmission information.

For example, the distance to the device transmitting the transmission information is used as an example for description.

Assuming that a distance to a device transmitting first transmission information is 1 kilometer and that a distance to a device transmitting second transmission information is 2 kilometers, it is determined that the feedback information for which transmission needs to be dropped is feedback information corresponding to the second transmission information.

In an embodiment of this disclosure, the feedback information for which transmission needs to be dropped may be determined based on fourth attribute information of the transmission information. The fourth attribute information may include any one of the following: QoS, a priority, an MCS, a size of a resource occupied by the transmission information, and a quantity of layers.

For example, a priority of the transmission information is used as an example for description.

It is assumed that a priority of the first transmission information is higher than a priority of the second transmission information. Then, it is determined that the feedback information for which transmission needs to be dropped is feedback information corresponding to the second transmission information.

In an embodiment of this disclosure, the feedback information for which transmission needs to be dropped may be determined based on the transmission mode for transmitting the transmission information. The transmission mode may include: transmitting the transmission information using a beam, or transmitting the transmission information without using a beam.

For example, it is assumed that the first transmission information is transmitted without using a beam and that the second transmission information is transmitted using a beam. Then, it is determined that the feedback information for which transmission needs to be dropped is feedback information corresponding to the first transmission information.

In an embodiment of this disclosure, the feedback information for which transmission needs to be dropped may be determined based on a response state of the feedback information.

In an embodiment of this disclosure, if feedback information corresponding to a negative acknowledgment state corresponds to unicast transmission or multicast transmission based on a second feedback manner, it is determined that the feedback information for which transmission needs to be dropped may be the feedback information corresponding to the negative acknowledgment state.

For example, assuming that feedback information 1 corresponding to the negative acknowledgment state corresponds to unicast transmission, feedback information 2 corresponding to the negative acknowledgment state corresponds to multicast transmission based on the second feedback manner, feedback information 3 corresponding to the negative acknowledgment state corresponds to multicast transmission based on the second feedback manner, and feedback information 4 corresponding to an acknowledgment state corresponds to multicast transmission based on the first feedback manner, it is determined that the feedback information for which transmission needs to be dropped may be feedback information corresponding to the feedback information 1, feedback information corresponding to the feedback information 2, and feedback information corresponding to the feedback information 3.

In an embodiment of this disclosure, if the feedback information corresponding to the negative acknowledgment state corresponds to unicast transmission or multicast transmission based on the second feedback manner, it is determined that the feedback information for which transmission needs to be dropped may be feedback information corresponding to the acknowledgment state.

For example, assuming that the feedback information 1 corresponding to the negative acknowledgment state corresponds to unicast transmission, the feedback information 2 corresponding to the negative acknowledgment state corresponds to multicast transmission based on the second feedback manner, the feedback information 3 corresponding to the negative acknowledgment state corresponds to multicast transmission based on the second feedback manner, and the feedback information 4 corresponding to the acknowledgment state corresponds to multicast transmission based on the first feedback manner, it is determined that the feedback information for which transmission needs to be dropped may be feedback information corresponding to the feedback information 4.

In an embodiment of this disclosure, if the feedback information corresponding to the negative acknowledgment state corresponds to multicast transmission based on the first feedback manner, it is determined that the feedback information for which transmission needs to be dropped is the feedback information corresponding to the negative acknowledgment state.

For example, assuming that the feedback information 1 corresponding to the negative acknowledgment state corresponds to multicast transmission based on the first feedback manner, the feedback information 2 corresponding to the negative acknowledgment state corresponds to multicast transmission based on the first feedback manner, feedback information 3 corresponding to the acknowledgment state corresponds to unicast transmission, and the feedback information 4 corresponding to the acknowledgment state corresponds to multicast transmission based on the second feedback manner, it is determined that the feedback information for which transmission needs to be dropped may be feedback information corresponding to the feedback information 1, and feedback information corresponding to the feedback information 2.

In an embodiment of this disclosure, if the feedback information corresponding to the negative acknowledgment state corresponds to multicast transmission based on the first feedback manner, it is determined that the feedback information for which transmission needs to be dropped is feedback information corresponding to the acknowledgment state.

For example, assuming that the feedback information 1 corresponding to the negative acknowledgment state corresponds to multicast transmission based on the first feedback manner, the feedback information 2 corresponding to the negative acknowledgment state corresponds to multicast transmission based on the first feedback manner, the feedback information 3 corresponding to the acknowledgment state corresponds to unicast transmission, and the feedback information 4 corresponding to the acknowledgment state corresponds to multicast transmission based on the second feedback manner, it is determined that the feedback information for which transmission needs to be dropped may be feedback information corresponding to the feedback information 3 and feedback information corresponding to the feedback information 4.

In an embodiment of this disclosure, if the feedback information corresponding to the negative acknowledgment state corresponds to multicast transmission based on the first feedback manner and multicast transmission not based on the first feedback manner, it is determined that the feedback information for which transmission needs to be dropped is feedback information corresponding to the negative acknowledgment state that corresponds to multicast transmission based on the first feedback manner.

For example, assuming that the feedback information 1 corresponding to the negative acknowledgment state corresponds to multicast transmission based on the first feedback manner, the feedback information 2 corresponding to the negative acknowledgment state corresponds to multicast transmission not based on the first feedback manner, the feedback information 3 corresponding to the negative acknowledgment state corresponds to multicast transmission not based on the first feedback manner, and feedback information 4 corresponding to the negative acknowledgment state corresponds to multicast transmission based on the first feedback manner, it is determined that the feedback information for which transmission needs to be dropped may be feedback information corresponding to the feedback information 1, and feedback information corresponding to the feedback information 4.

In an embodiment of this disclosure, if the feedback information corresponding to the negative acknowledgment state corresponds to multicast transmission based on the first feedback manner and multicast transmission not based on the first feedback manner, it is determined that the feedback information for which transmission needs to be dropped is feedback information corresponding to the negative acknowledgment state that corresponds to multicast transmission not based on the first feedback manner.

For example, assuming that the feedback information 1 corresponding to the negative acknowledgment state corresponds to multicast transmission based on the first feedback manner, the feedback information 2 corresponding to the negative acknowledgment state corresponds to multicast transmission not based on the first feedback manner, the feedback information 3 corresponding to the negative acknowledgment state corresponds to multicast transmission not based on the first feedback manner, and the feedback information 4 corresponding to the negative acknowledgment state corresponds to multicast transmission based on the first feedback manner, it is determined that the feedback information for which transmission needs to be dropped may be feedback information corresponding to the feedback information 2 and feedback information corresponding to the feedback information 3.

In an embodiment of this disclosure, when less than N pieces of feedback information corresponding to the acknowledgment state need to be dropped from N pieces of feedback information corresponding to the acknowledgment state, or when less than N pieces of feedback information corresponding to the negative acknowledgment state need to be dropped from N pieces of feedback information corresponding to the negative acknowledgment state, or when one or more pieces of feedback information corresponding to the negative acknowledgment state need to be dropped in addition to feedback information corresponding to the acknowledgment state, or when one or more pieces of feedback information corresponding to the acknowledgment state need to be dropped in addition to feedback information corresponding to the negative acknowledgment state, the feedback information for which transmission needs to be dropped may be randomly selected, or the feedback information for which transmission needs to be dropped may be determined based on third attribute information of a channel state of a physical sidelink channel, or the feedback information for which transmission needs to be dropped may be determined based on fourth attribute information of the transmission information, or the feedback information for which transmission needs to be dropped may be determined based on a transmission mode of transmitting the transmission information.

In an embodiment of this disclosure, the feedback information for which transmission needs to be dropped may be determined based on a transmission type of the at least one piece of transmission information.

For example, it is assumed that a transmission type of transmission information 1 is unicast, that a transmission type of transmission information 2 is multicast based on the first feedback manner, that a transmission type of transmission information 3 is multicast based on the second feedback manner, and that a transmission type of transmission information 4 is unicast. Then, it is determined that the feedback information for which transmission needs to be dropped may be feedback information corresponding to the transmission information 1 and feedback information corresponding to the transmission information 4.

In an embodiment of this disclosure, the feedback information for which transmission needs to be dropped may be determined based on a priority corresponding to the transmission type of the at least one piece of transmission information.

For example, it is assumed that a priority of unicast is higher than that of multicast based on the first feedback manner, and a priority of multicast based on the first feedback manner is higher than that of multicast based on the second feedback manner.

A transmission type of transmission information 1 is unicast, a transmission type of transmission information 1 is multicast based on the first feedback manner, a transmission type of transmission information 3 is multicast based on the second feedback manner, and a transmission type of transmission information 4 is multicast based on the first feedback manner. Then, it is determined that the feedback information for which transmission needs to be dropped may be feedback information corresponding to the transmission information 3.

In an embodiment of this disclosure, the feedback information for which transmission needs to be dropped may be determined based on a PSFCH format corresponding to each piece of feedback information.

For example, it is assumed that a PSFCH format corresponding to feedback information 1 is a first PSFCH format, a PSFCH format corresponding to feedback information 2 is a second PSFCH format, a PSFCH format corresponding to feedback information 3 is the second PSFCH format, and a PSFCH format corresponding to feedback information 4 is a third PSFCH format. Then, it is determined that the feedback information for which transmission needs to be dropped may be the feedback information 2 and the feedback information 3.

In an embodiment of this disclosure, the feedback information for which transmission needs to be dropped may be determined based on a priority of the PSFCH format corresponding to each piece of feedback information.

For example, it is assumed that a priority of the first PSFCH format is higher than a priority of the second PSFCH format, and the priority of the second PSFCH format is higher than a priority of the third PSFCH format. The PSFCH format corresponding to the feedback information 1 is the first PSFCH format, the PSFCH format corresponding to the feedback information 2 is the third PSFCH format, the PSFCH format corresponding to the feedback information 3 is the second PSFCH format, and the PSFCH format corresponding to the feedback information 4 is the third PSFCH format. Then, it is determined that the feedback information for which transmission needs to be dropped may be the feedback information 2 and the feedback information 4.

In an embodiment of this disclosure, before the transmitting corresponding feedback information on at least one PSFCH resource based on the power information corresponding to each piece of feedback information, the feedback information transmission method provided in this embodiment of this disclosure may further include: performing a logical operation on feedback information for one transmit end, to obtain a logical operation result of the feedback information for the one transmit end; and transmitting the logical operation result of the feedback information for the one transmit end on a predefined or preconfigured PSFCH resource.

In an embodiment of this disclosure, the logical operation may be a logical AND operation, a logical OR operation, or logical AND and OR operations.

For example, assuming that feedback information for a transmit end X includes feedback information 1, feedback information 2, and feedback information 3, and feedback information for a transmit end Y includes feedback information 4 and feedback information 5, a logical operation is performed on the feedback information 1, the feedback information 2, and the feedback information 3 to obtain a logical operation result of the feedback information for the transmit end X, and a logical operation is performed on the feedback information 4 and the feedback information 5 to obtain a logical operation result of the feedback information for the transmit end Y. The logical operation result of the feedback information for the transmit end X is configured on a first PSFCH channel resource, and the logical operation result of the feedback information for the transmit end Y is configured on a second PSFCH channel resource.

In an embodiment of this disclosure, the PSFCH resource on which the logical operation result of the feedback information is configured may be a PSFCH resource with the largest or smallest index in PSFCH channel resources.

In an embodiment of this disclosure, it may be specified that when a receiving device performs feedback on a plurality of pieces of transmission information from one transmitting device simultaneously, the receiving device needs to perform a logical operation on a plurality of pieces of feedback information corresponding to the plurality of pieces of transmission information. When the transmitting device receives the feedback from the receiving device, it is considered by default that the receiving device has performed a logical operation on the plurality of pieces of feedback information corresponding to the plurality of pieces of transmission information.

In an embodiment of this disclosure, a transmit power corresponding to the logical operation result of the feedback information for one transmit end may be a sum of transmit powers corresponding to the feedback information for the one transmit end.

In an embodiment of this disclosure, before the receiving at least one piece of transmission information transmitted on at least one physical sidelink channel, the feedback information transmission method provided in this embodiment of this disclosure may further include: transmitting indication information to each transmit end, where the indication information is used to indicate a physical sidelink channel resource that is used for transmission by each transmit end.

In an embodiment of this disclosure, the receiving device may notify the transmitting device of the physical sidelink channel resource that is used for transmission by the transmitting device.

The receiving device may notify the transmitting device in the following several manners:

Manner 1: notifying in a form of a physical sidelink channel resource, for example, notifying the transmitting device of a time-frequency resource for a physical sidelink channel used for transmission by the transmitting device and a periodicity of the time-frequency resource. Based on this, the indication information may include: a time-frequency resource for a physical sidelink channel used for transmission by each transmit end and a periodicity of the time-frequency resource. For another example, the transmitting device is notified of a time-frequency resource set for the physical sidelink channel used for transmission by the transmitting device and a periodicity of the time-frequency resource set. Based on this, the indication information may include: a time-frequency resource set for the physical sidelink channel used for transmission by each transmit end and a periodicity of the time-frequency resource set.

Manner 2: notifying in a form of a PSFCH occasion, for example, notifying the transmitting device of a PSFCH occasion corresponding to a physical sidelink channel resource that is used for transmission by the transmitting device and a periodicity of the PSFCH occasion. Based on this, the indication information may include: a PSFCH occasion corresponding to the physical sidelink channel resource that is used for transmission by each transmit end and a periodicity of the PSFCH occasion.

Manner 3: notifying by means of signaling. For example, the transmitting device is notified, through higher layer signaling or physical layer signaling, of the physical sidelink channel resource used for transmission by the transmitting device. The higher layer signaling is, for example, radio resource control (RRC) signaling. The physical layer signaling is, for example, sidelink control information (SCI). Based on this, the indication information is carried by signaling, and the signaling includes higher layer signaling or physical layer signaling.

The transmitting device needs to transmit the transmission information on the physical sidelink channel resource notified by the receiving device; or the transmitting device may choose whether to transmit the transmission information on the physical sidelink channel resource notified by the receiving device.

According to this embodiment of this disclosure, the receiving device can coordinate different PSFCH occasions corresponding to transmissions on physical sidelink channel resources of different transmitting devices, thereby avoiding, at its source, transmitting corresponding feedback information on different PSFCHs simultaneously.

According to the feedback information transmission method in this embodiment of this disclosure, the power information corresponding to each of the at least one piece of feedback information that corresponds to the at least one piece of transmission information is determined; and the corresponding feedback information is transmitted on the at least one PSFCH resource based on the power information corresponding to each piece of feedback information, so that the corresponding feedback information can be transmitted based on the power information corresponding to each piece of feedback information.

Figure 3:
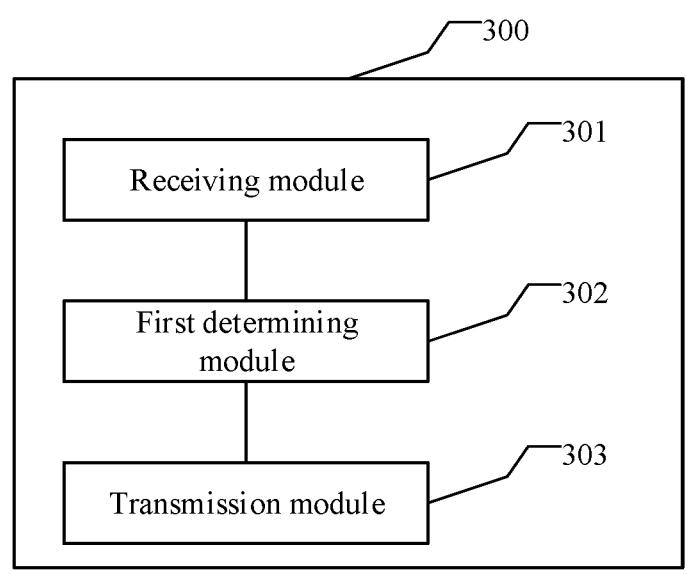
FIG. 3 is a schematic diagram of a structure of a feedback information transmission apparatus according to an embodiment of this disclosure.

Corresponding to the foregoing method embodiment, an embodiment of this disclosure further provides a feedback information transmission apparatus. As shown in FIG. 3, FIG. 3 is a schematic diagram of a structure of a feedback information transmission apparatus according to an embodiment of this disclosure. The feedback information transmission apparatus 300 may include:

a receiving module 301, configured to receive at least one piece of transmission information transmitted on at least one physical sidelink channel, where one piece of transmission information is transmitted on each physical sidelink channel;

a first determining module 302, configured to determine power information corresponding to each of at least one piece of feedback information that corresponds to the at least one piece of transmission information; and a transmission module 303, configured to transmit corresponding feedback information on at least one PSFCH resource based on the power information corresponding to each piece of feedback information.

In an embodiment of this disclosure, the first determining module 302 may be specifically configured to:

determine that the power information corresponding to each piece of feedback information is preset power information; or determine that the power information corresponding to each piece of feedback information is an arithmetic mean of total power information.

In an embodiment of this disclosure, the first determining module 302 may be specifically configured to:

determine the power information corresponding to each piece of feedback information based on first attribute information.

In an embodiment of this disclosure, the first attribute information may include any one of the following:

CSI of a monitored link, an RSRP of the monitored link, a distance to a device transmitting the transmission information, and a location of the device transmitting the transmission information.

In an embodiment of this disclosure, the first determining module 302 may be specifically configured to:

determine the power information corresponding to each piece of feedback information based on second attribute information of the transmission information.

In an embodiment of this disclosure, the second attribute information may include any one of the following:

QoS, a priority, an MCS, a size of a resource occupied, and a quantity of layers.

In an embodiment of this disclosure, the first determining module 302 may be specifically configured to:

determine the power information corresponding to each piece of feedback information based on a transmission mode for transmitting the transmission information.

In an embodiment of this disclosure, the transmission mode may include:

transmitting the transmission information using a beam, or transmitting the transmission information without using a beam.

In an embodiment of this disclosure, the first determining module 302 may be specifically configured to:

determine the power information corresponding to each piece of feedback information based on a transmission type of the at least one piece of transmission information.

In an embodiment of this disclosure, the first determining module 302 may be specifically configured to:

determine the power information corresponding to each piece of feedback information based on a priority corresponding to the transmission type of the at least one piece of transmission information.

In an embodiment of this disclosure, the first determining module 302 may be specifically configured to:

determine the power information corresponding to each piece of feedback information based on a PSFCH format corresponding to each piece of feedback information.

In an embodiment of this disclosure, the first determining module 302 may be specifically configured to:
determine the power information corresponding to each piece of feedback information based on a priority of the PSFCH format corresponding to each piece of feedback information.

In an embodiment of this disclosure, the feedback information transmission apparatus provided in this embodiment of this disclosure may further include:
a second determining module, configured to determine feedback information for which transmission needs to be dropped.

In an embodiment of this disclosure, the first determining module 302 may be specifically configured to:
determine power information corresponding to each piece of feedback information for which transmission has not been dropped.

In an embodiment of this disclosure, the second determining module may be specifically configured to:
determine, based on third attribute information, the feedback information for which transmission needs to be dropped.

In an embodiment of this disclosure, the third attribute information may include any one of the following:
CSI of a monitored link, an RSRP of the monitored link, a distance to a device transmitting the transmission information, and a location of the device transmitting the transmission information.

In an embodiment of this disclosure, the second determining module may be specifically configured to:
determine, based on fourth attribute information of the transmission information, the feedback information for which transmission needs to be dropped.

In an embodiment of this disclosure, the fourth attribute information may include any one of the following:
QoS, a priority, an MCS, a size of a resource occupied by the transmission information, and a quantity of layers.

In an embodiment of this disclosure, the second determining module may be specifically configured to:
determine, based on the transmission mode for transmitting the transmission information, the feedback information for which transmission needs to be dropped.

In an embodiment of this disclosure, the transmission mode may include:
transmitting the transmission information using a beam, or transmitting the transmission information without using a beam.

In an embodiment of this disclosure, the second determining module may be specifically configured to:
determine, based on a response state of the feedback information, the feedback information for which transmission needs to be dropped, where the response state includes an acknowledgment state and a negative acknowledgment state.

In an embodiment of this disclosure, the second determining module may be specifically configured to:
if feedback information corresponding to the negative acknowledgment state corresponds to unicast transmission or multicast transmission based on a second feedback manner, determine that the feedback information for which transmission needs to be dropped is the feedback information corresponding to the negative acknowledgment state or feedback information corresponding to the acknowledgment state; or
if the feedback information corresponding to the negative acknowledgment state corresponds to multicast transmission based on a first feedback manner, determine that the feedback information for which transmission needs to be dropped is the feedback information corresponding to the negative acknowledgment state or the feedback information corresponding to the acknowledgment state; or
if the feedback information corresponding to the negative acknowledgment state corresponds to multicast transmission based on the first feedback manner and multicast transmission not based on the first feedback manner, determine that the feedback information for which transmission needs to be dropped is feedback information corresponding to the negative acknowledgment state that corresponds to multicast transmission based on the first feedback manner or feedback information corresponding to the negative acknowledgment state that corresponds to multicast transmission not based on the first feedback manner.

In an embodiment of this disclosure, the second determining module may be specifically configured to:
determine, based on a transmission type of the at least one piece of transmission information, the feedback information for which transmission needs to be dropped.

In an embodiment of this disclosure, the second determining module may be specifically configured to:
determine, based on a priority corresponding to the transmission type of the at least one piece of transmission information, the feedback information for which transmission needs to be dropped.

In an embodiment of this disclosure, the second determining module may be specifically configured to:
determine, based on the PSFCH format corresponding to each piece of feedback information, the feedback information for which transmission needs to be dropped.

In an embodiment of this disclosure, the second determining module may be specifically configured to:
determine, based on a priority of the PSFCH format corresponding to each piece of feedback information, the feedback information for which transmission needs to be dropped.

In an embodiment of this disclosure, the feedback information transmission apparatus provided in this embodiment of this disclosure may further include:
an operation module, configured to perform a logical operation on feedback information for one transmit end, to obtain a logical operation result of the feedback information for the one transmit end; and transmit the logical operation result of the feedback information for the one transmit end on a predefined or preconfigured PSFCH resource.

In an embodiment of this disclosure, the logical operation may include:
a logical AND operation, a logical OR operation, or logical AND and OR operations.

In an embodiment of this disclosure, the feedback information transmission apparatus provided in this embodiment of this disclosure may further include:
a transmitting module, configured to transmit indication information to each transmit end, where the indication information is used to indicate a physical sidelink channel resource that is used for transmission by each transmit end.

In an embodiment of this disclosure, the indication information may be carried by signaling, and the signaling may include higher layer signaling or physical layer signaling.

In an embodiment of this disclosure, the indication information may include:

a time-frequency resource for a physical sidelink channel used for transmission by each transmit end and a periodicity of the time-frequency resource; or a time-frequency resource set for a physical sidelink channel used for transmission by each transmit end and a periodicity of the time-frequency resource set; or a PSFCH occasion corresponding to the physical sidelink channel resource used for transmission by each transmit end and a periodicity of the PSFCH occasion.

An embodiment of this disclosure further provides a terminal device, and the terminal device can transmit data through a physical sidelink channel. For example, a HARQ is received through a PSSCH or a PSCCH, and feedback information corresponding to the HARQ is fed back through a PSFCH.

Figure 4:
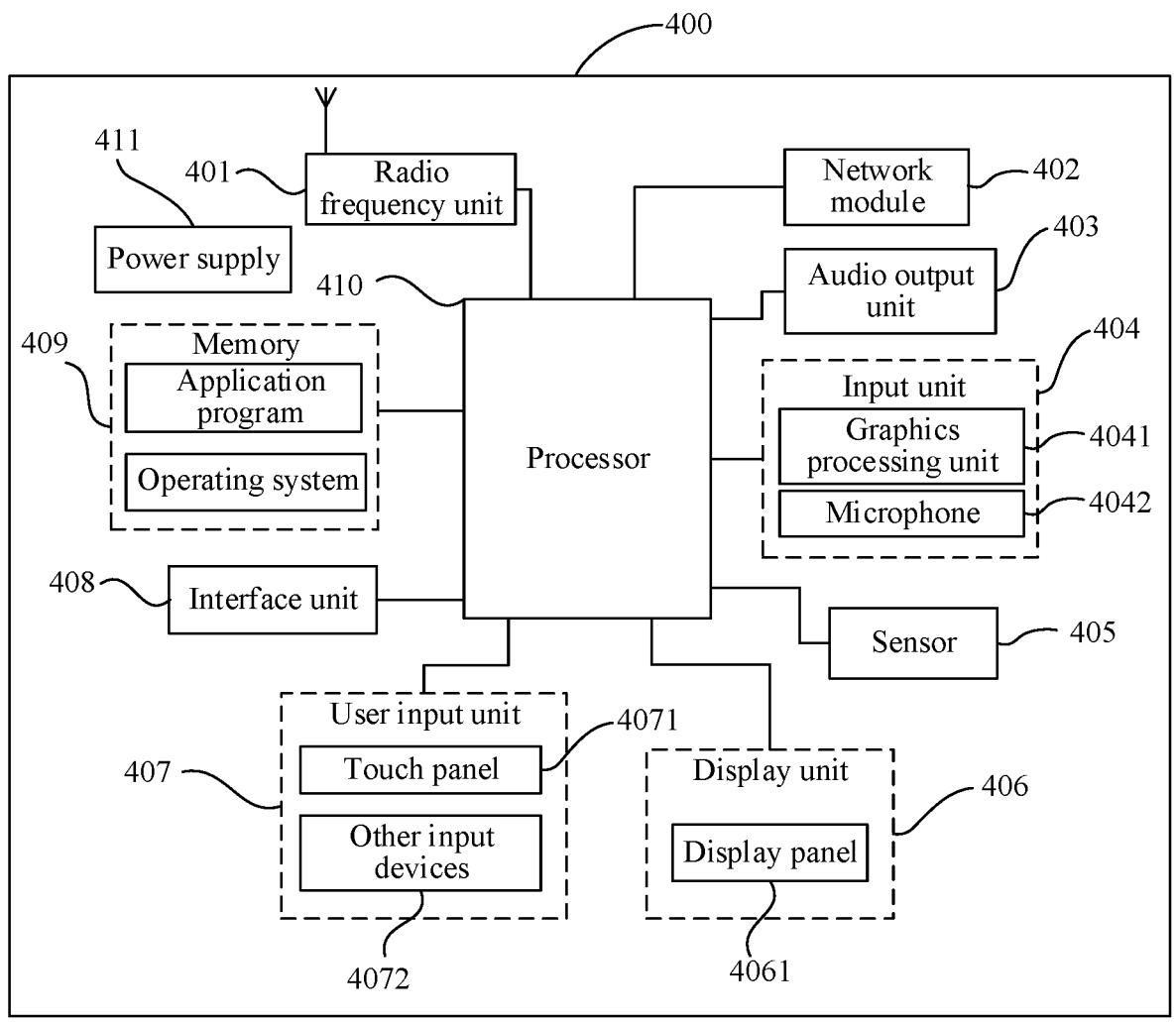
FIG. 4 is a schematic diagram of a hardware structure of a terminal device according to an embodiment of this disclosure.

FIG. 4 is a schematic diagram of a hardware structure of a terminal device according to an embodiment of this disclosure. The terminal device 400 includes, but is not limited to: a radio frequency unit 401, a network module 402, an audio output unit 403, an input unit 404, a sensor 405, a display unit 406, a user input unit 407, an interface unit 408, a memory 409, a processor 410 and a power supply 411. A person skilled in the art may understand that a structure of the terminal device shown in FIG. 4 does not constitute a limitation to the terminal device, and the terminal device may include more or fewer components than those shown in the figure, or combine some components, or have different component arrangements. In this embodiment of this disclosure, the terminal device includes but is not limited to a mobile phone, a tablet computer, a laptop computer, a palmtop computer, a vehicle-mounted mobile terminal, a wearable device, a pedometer, or the like.

The processor 410 is configured to receive at least one piece of transmission information transmitted on at least one physical sidelink channel, where one piece of transmission information is transmitted on each physical sidelink channel; determine power information corresponding to each of at least one piece of feedback information that corresponds to the at least one piece of transmission information; and transmit corresponding feedback information on at least one PSFCH resource based on the power information corresponding to each piece of feedback information.

According to this embodiment of this disclosure, the power information corresponding to each of the at least one piece of feedback information that corresponds to the at least one piece of transmission information is determined; and the corresponding feedback information is transmitted on the at least one PSFCH resource based on the power information corresponding to each piece of feedback information, so that the corresponding feedback information can be transmitted based on the power information corresponding to each piece of feedback information.

It should be understood that, in this embodiment of this disclosure, the radio frequency unit 401 may be configured to receive and transmit a signal in an information transmitting/receiving or call process. Specifically, the radio frequency unit 401 receives downlink data from a base station, and transmits the downlink data to the processor 410 for processing; and in addition, transmits uplink data to the base station. Generally, the radio frequency unit 401 includes, but is not limited to, an antenna, at least one amplifier, a transceiver, a coupler, a low noise amplifier, a duplexer, and the like. In addition, the radio frequency unit 401 may further communicate with another device by using a wireless communications system and network.

The terminal device provides a user with wireless broadband Internet access through the network module 402, for example, helps the user send and receive emails, browse web pages, and access streaming media.

The audio output unit 403 can convert audio data received by the radio frequency unit 401 or the network module 402 or stored in the memory 409 into an audio signal, and output the audio signal into sound. In addition, the audio output unit 403 can also provide audio output related to a specific function performed by the terminal device 400 (for example, call signal receiving sound or message receiving sound). The audio output unit 403 includes a speaker, a buzzer, a telephone receiver, and the like.

The input unit 404 is configured to receive audio or video signals. The input unit 404 may include a graphics processing unit (GPU) 4041 and a microphone 4042. The graphics processing unit 4041 processes image data of a static image or a video obtained by an image capturing apparatus (such as, a camera) in a video capturing mode or an image capturing mode. A processed image frame can be displayed on the display unit 406. The image frame processed by the graphics processing unit 4041 can be stored in the memory 409 (or another storage medium) or sent via the radio frequency unit 401 or the network module 402. The microphone 4042 may receive sound and can process such sound into audio data. The processed audio data may be converted, in a telephone call mode, into a format that may be sent by the radio frequency unit 401 to a mobile communication base station for output.

The terminal device 400 further includes at least one sensor 405, such as a light sensor, a motion sensor, and another sensor. Specifically, the light sensor includes an ambient light sensor and a proximity sensor, where the ambient light sensor can adjust brightness of the display panel 4061 based on brightness of ambient light, and the proximity sensor can turn off the display panel 4061 and/or backlight when the terminal device 400 moves towards the ear. As a type of motion sensor, an accelerometer sensor can detect magnitudes of accelerations in all directions (usually three axes), can detect a magnitude and a direction of gravity when the mobile phone is in a static state, and can be applied to mobile phone posture recognition (such as screen switching between portrait and landscape, related games, and magnetometer posture calibration), functions related to vibration recognition (such as pedometer and tapping), and the like. The sensor 405 may also include a fingerprint sensor, a pressure sensor, an iris sensor, a molecular sensor, a gyroscope, a barometer, a hygrometer, a thermometer, an infrared sensor, and the like. Details are not described herein.

The display unit 406 is configured to display information entered by a user or information provided for the user. The display unit 406 may include a display panel 4061, and the display panel 4061 may be configured in a form of liquid crystal display (LCD), organic light-emitting diode (OLED), or the like.

The user input unit 407 may be configured to receive entered digit or character information and generate key signal input related to user setting and function control of the terminal device. Specifically, the user input unit 407 includes a touch panel 4071 and another input device 4072. The touch panel 4071 is also referred to as a touchscreen, and may collect a touch operation performed by a user on or near the touch panel 4071 (for example, an operation performed by a user on the touch panel 4071 or near the touch panel 4071 by using any proper object or accessory such as a finger or a stylus). The touch panel 4071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 410, and can receive and execute a command sent by the processor 410. In addition, the touch panel 4071 may be implemented in various types such as resistive, capacitive, infrared, and surface acoustic wave. In addition to the touch panel 4071, the user input unit 407 may further include another input device 4072. Specifically, the another input device 4072 may include but is not limited to, a physical keyboard, functional keys (for example, a volume control key and a switch key), a trackball, a mouse, and a joystick. Details are not described herein again.

Further, the touch panel 4071 can cover the display panel 4061. When detecting a touch operation on or near the touch panel 4071, the touch panel 4071 transmits the touch operation to the processor 410 to determine a type of a touch event. Then, the processor 410 provides corresponding visual output on the display panel 4061 based on the type of the touch event. In FIG. 4, the touch panel 4071 and the display panel 4061 are used as two independent components to implement input and output functions of the terminal device. However, in some embodiments, the touch panel 4071 and the display panel 4061 may be integrated to implement the input and output functions of the terminal device. This is not specifically limited herein.

The interface unit 408 is an interface connecting an external apparatus to the terminal device 400. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, and a headset port. The interface unit 408 may be configured to receive an input (for example, data information and power) from the external apparatus and transmit the received input to one or more elements in the terminal device 400, or transmit data between the terminal device 400 and the external apparatus.

The memory 409 may be configured to store software programs and various data. The memory 409 may mainly include a program storage area and a data storage area. The program storage area may store an operating system, an application program required by at least one function (for example, an audio playing function and an image playing function), and the like. The data storage area may store data (for example, audio data and an address book) created according to use of the mobile phone. In addition, the memory 409 may include a high-speed random access memory, and may further include a nonvolatile memory, for example, at least one disk storage device, a flash memory device, or another volatile solid-state storage device.

The processor 410 is a control center of the terminal device, which connects all parts of the entire terminal device by using various interfaces and lines. By running or executing software programs and/or modules stored in the memory 409 and invoking data stored in the memory 409, the processor 410 performs various functions and data processing for the terminal device, to implement overall monitoring on the terminal device. The processor 410 may include one or more processing units. Optionally, the processor 410 may integrate an application processor and a modem processor. The application processor mainly processes an operating system, a user interface, an application program, and the like. The modem processor mainly processes wireless communication. It should be understood that the modem processor may be not integrated in the processor 410.

The terminal device 400 may further include the power supply 411 (such as a battery) that supplies power to the components. Optionally, the power supply 411 may be logically connected to the processor 410 through a power management system, to implement functions such as charging, discharging, and power consumption management through the power management system.

In addition, the terminal device 400 includes some functional modules not shown. Details are not described herein again.

Optionally, an embodiment of this disclosure further provides a terminal device, including a processor 410, a memory 409, and a computer program stored on the memory 409 and capable of running on the processor 410. When the computer program is executed by the processor 410, the processes of the feedback information transmission method embodiment are implemented, with the same technical effect achieved. To avoid repetition, details are not described herein again.

An embodiment of this disclosure further provides a computer-readable storage medium. The computer-readable storage medium stores computer program instructions, and when the computer program instructions are executed by a processor, the processes of the feedback information transmission method embodiment provided in the embodiments of this disclosure are implemented, with the same technical effects achieved. To avoid repetition, details are not described again herein. An example of the computer-readable storage medium includes a non-transitory computer-readable storage medium, such as a read-only memory (ROM), a random access memory (RAM), a magnetic disk, or a compact disc.

The various aspects of this disclosure are described above with reference to the flowcharts and/or block diagrams of the method, the apparatus (system), and the computer program product according to the embodiments of this disclosure. It should be understood that each block of the flowcharts and/or block diagrams and a combination of blocks of the flowcharts and/or block diagrams can be implemented by using computer program instructions. These computer program instructions may be provided to a processor of a general-purpose computer, a dedicated computer, or another programmable data processing apparatus to generate a machine, so that when these instructions are executed by the processor of the computer or the another programmable data processing apparatus, the functions/actions specified in one or more blocks of the flowcharts and/or block diagrams can be implemented. Such a processor may be, but is not limited to, a general-purpose processor, a dedicated processor, a special application processor, or a field-programmable logic circuit. It may also be noted that each block in the block diagrams and/or the flowcharts, and a combination of the blocks in the block diagrams and/or the flowcharts may also be implemented by dedicated hardware that executes specified functions or actions, or may be implemented by a combination of dedicated hardware and computer instructions.

It should be noted that although the foregoing embodiments have been described herein, the scope of patent protection of this disclosure is not limited thereby. Therefore, based on the inventive concept of this disclosure, alternations and modifications to the embodiments described herein, equivalent structures or equivalent process transformations made using the content of the specification and accompanying drawings of this disclosure, and any direct or indirect application of the foregoing technical solutions in other related technical fields shall equally fall within the patent protection scope of this disclosure.

What is claimed is:

1. A feedback information transmission method, performed by a terminal device, comprising:
   receiving at least one piece of transmission information transmitted on at least one physical sidelink channel;
   determining power information corresponding to each of at least one piece of feedback information that corresponds to the at least one piece of transmission information; and
   transmitting corresponding feedback information on at least one physical sidelink feedback channel resource based on the power information corresponding to each piece of feedback information;
   wherein before the determining power information corresponding to each of at least one piece of feedback information that corresponds to the at least one piece of transmission information, the method further comprises:
   determining feedback information for which transmission needs to be dropped;
   wherein the determining feedback information for which transmission needs to be dropped comprises:
   determining, based on fourth attribute information of the transmission information, the feedback information for which transmission needs to be dropped, wherein the fourth attribute information comprises a priority;
   wherein the determining power information corresponding to each of at least one piece of feedback information that corresponds to the at least one piece of transmission information comprises:
   determining power information corresponding to each piece of feedback information for which transmission has not been dropped;
   wherein the determining power information corresponding to each piece of feedback information for which transmission has not been dropped comprises:
   determining that the power information corresponding to each piece of feedback information for which transmission has not been dropped is preset power information; or
   determining that the power information corresponding to each piece of feedback information for which transmission has not been dropped is an arithmetic mean of total power information divided by a quantity of feedback information.

2. The method according to claim 1, wherein the determining power information corresponding to each of at least one piece of feedback information that corresponds to the at least one piece of transmission information comprises:
   determining the power information corresponding to each piece of feedback information based on first attribute information, wherein the first attribute information comprises any one of the following:
   channel state information of a monitored link, a reference signal received power of the monitored link, a distance to a device transmitting the transmission information, or a location of the device transmitting the transmission information; or,
   wherein the determining power information corresponding to each of at least one piece of feedback information that corresponds to the at least one piece of transmission information comprises:
   determining the power information corresponding to each piece of feedback information based on second attribute information of the transmission information, wherein the second attribute information comprises any one of the following:
   quality of service, a priority, a modulation and coding scheme, a size of a resource occupied, or a quantity of layers.

3. The method according to claim 1, wherein the determining power information corresponding to each of at least one piece of feedback information that corresponds to the at least one piece of transmission information comprises:
   determining the power information corresponding to each piece of feedback information based on a transmission mode for transmitting the transmission information, wherein the transmission mode comprises:
   transmitting the transmission information using a beam, or transmitting the transmission information without using a beam; or,
   wherein the determining power information corresponding to each of at least one piece of feedback information that corresponds to the at least one piece of transmission information comprises:
   determining the power information corresponding to each piece of feedback information based on a transmission type of the at least one piece of transmission information; or,
   wherein the determining power information corresponding to each of at least one piece of feedback information that corresponds to the at least one piece of transmission information comprises:
   determining the power information corresponding to each piece of feedback information based on a physical sidelink feedback channel format corresponding to each piece of feedback information.

4. The method according to claim 1, wherein the determining feedback information for which transmission needs to be dropped comprises:
   determining feedback information for which transmission needs to be dropped, until a quantity of feedback information for which transmission has not been dropped reaches a first quantity, wherein the first quantity is a quantity of simultaneously transmitted feedback information that can be supported by a transmit power of a transmitting device.

5. The method according to claim 1, wherein before the transmitting corresponding feedback information on at least one physical sidelink feedback channel resource based on the power information corresponding to each piece of feedback information, the method further comprises:
   performing a logical operation on feedback information for one transmit end, to obtain a logical operation result of the feedback information for the one transmit end; and
   transmitting the logical operation result of the feedback information for the one transmit end on a predefined or preconfigured physical sidelink feedback channel resource.

6. The method according to claim 1, wherein before the receiving at least one piece of transmission information transmitted on at least one physical sidelink channel, the method further comprises:

transmitting indication information to each transmit end, wherein the indication information is used to indicate a physical sidelink channel resource that is used for transmission by each transmit end.

7. A terminal device, comprising a processor, a memory, and a program stored on the memory and capable of running on the processor, wherein when the program is executed by the processor, the steps of a feedback information transmission method are implemented, wherein the feedback information transmission method comprises:
  receiving at least one piece of transmission information transmitted on at least one physical sidelink channel;
  determining power information corresponding to each of at least one piece of feedback information that corresponds to the at least one piece of transmission information; and
  transmitting corresponding feedback information on at least one physical sidelink feedback channel resource based on the power information corresponding to each piece of feedback information;
  wherein before the determining power information corresponding to each of at least one piece of feedback information that corresponds to the at least one piece of transmission information, the method further comprises:
  determining feedback information for which transmission needs to be dropped;
  wherein the determining feedback information for which transmission needs to be dropped comprises:
  determining, based on fourth attribute information of the transmission information, the feedback information for which transmission needs to be dropped, wherein the fourth attribute information comprises
  a priority;
  wherein the determining power information corresponding to each of at least one piece of feedback information that corresponds to the at least one piece of transmission information comprises:
  determining power information corresponding to each piece of feedback information for which transmission has not been dropped;
  wherein the determining power information corresponding to each piece of feedback information for which transmission has not been dropped comprises:
  determining that the power information corresponding to each piece of feedback information for which transmission has not been dropped is preset power information; or
  determining that the power information corresponding to each piece of feedback information for which transmission has not been dropped is an arithmetic mean of total power information divided by a quantity of feedback information.

8. The terminal device according to claim 7, wherein the determining feedback information for which transmission needs to be dropped comprises:
  determining feedback information for which transmission needs to be dropped, until a quantity of feedback information for which transmission has not been dropped reaches a first quantity, wherein the first quantity is a quantity of simultaneously transmitted feedback information that can be supported by a transmit power of a transmitting device.

9. A non-transitory computer-readable storage medium, wherein the non-transitory computer-readable storage medium stores a program, and when the program is executed by a processor, the steps of a feedback information transmission method are implemented, wherein the feedback information transmission method comprises:
  receiving at least one piece of transmission information transmitted on at least one physical sidelink channel;
  determining power information corresponding to each of at least one piece of feedback information that corresponds to the at least one piece of transmission information; and
  transmitting corresponding feedback information on at least one physical sidelink feedback channel resource based on the power information corresponding to each piece of feedback information;
  wherein before the determining power information corresponding to each of at least one piece of feedback information that corresponds to the at least one piece of transmission information, the method further comprises:
  determining feedback information for which transmission needs to be dropped;
  wherein the determining feedback information for which transmission needs to be dropped comprises:
  determining, based on fourth attribute information of the transmission information, the feedback information for which transmission needs to be dropped, wherein the fourth attribute information comprises
  a priority;
  wherein the determining power information corresponding to each of at least one piece of feedback information that corresponds to the at least one piece of transmission information comprises:
  determining power information corresponding to each piece of feedback information for which transmission has not been dropped;
  wherein the determining power information corresponding to each piece of feedback information for which transmission has not been dropped comprises:
  determining that the power information corresponding to each piece of feedback information for which transmission has not been dropped is preset power information; or
  determining that the power information corresponding to each piece of feedback information for which transmission has not been dropped is an arithmetic mean of total power information divided by a quantity of feedback information.

10. The terminal device according to claim 7, wherein the determining power information corresponding to each of at least one piece of feedback information that corresponds to the at least one piece of transmission information comprises:
  determining the power information corresponding to each piece of feedback information based on first attribute information, wherein the first attribute information comprises any one of the following:
  channel state information of a monitored link, a reference signal received power of the monitored link, a distance to a device transmitting the transmission information, or a location of the device transmitting the transmission information; or,
  wherein the determining power information corresponding to each of at least one piece of feedback information that corresponds to the at least one piece of transmission information comprises:
  determining the power information corresponding to each piece of feedback information based on second attribute information of the transmission information, wherein the second attribute information comprises any one of the following:

quality of service, a priority, a modulation and coding scheme, a size of a resource occupied, or a quantity of layers.

11. The terminal device according to claim 7, wherein the determining power information corresponding to each of at least one piece of feedback information that corresponds to the at least one piece of transmission information comprises:
   determining the power information corresponding to each piece of feedback information based on a transmission mode for transmitting the transmission information, wherein the transmission mode comprises:
   transmitting the transmission information using a beam, or transmitting the transmission information without using a beam; or,
   wherein the determining power information corresponding to each of at least one piece of feedback information that corresponds to the at least one piece of transmission information comprises:
   determining the power information corresponding to each piece of feedback information based on a transmission type of the at least one piece of transmission information; or,
   wherein the determining power information corresponding to each of at least one piece of feedback information that corresponds to the at least one piece of transmission information comprises:
   determining the power information corresponding to each piece of feedback information based on a physical sidelink feedback channel format corresponding to each piece of feedback information.

12. The terminal device according to claim 7, wherein before the transmitting corresponding feedback information on at least one physical sidelink feedback channel resource based on the power information corresponding to each piece of feedback information, the method further comprises:
   performing a logical operation on feedback information for one transmit end, to obtain a logical operation result of the feedback information for the one transmit end; and
   transmitting the logical operation result of the feedback information for the one transmit end on a predefined or preconfigured physical sidelink feedback channel resource.

13. The terminal device according to claim 7, wherein before the receiving at least one piece of transmission information transmitted on at least one physical sidelink channel, the method further comprises:
   transmitting indication information to each transmit end, wherein the indication information is used to indicate a physical sidelink channel resource that is used for transmission by each transmit end.

14. The non-transitory computer-readable storage medium according to claim 9, wherein the determining power information corresponding to each of at least one piece of feedback information that corresponds to the at least one piece of transmission information comprises:
   determining the power information corresponding to each piece of feedback information based on first attribute information, wherein the first attribute information comprises any one of the following:
   channel state information of a monitored link, a reference signal received power of the monitored link, a distance to a device transmitting the transmission information, or a location of the device transmitting the transmission information; or,
   wherein the determining power information corresponding to each of at least one piece of feedback information that corresponds to the at least one piece of transmission information comprises:
   determining the power information corresponding to each piece of feedback information based on second attribute information of the transmission information, wherein the second attribute information comprises any one of the following:
   quality of service, a priority, a modulation and coding scheme, a size of a resource occupied, or a quantity of layers.

15. The non-transitory computer-readable storage medium according to claim 9, wherein the determining power information corresponding to each of at least one piece of feedback information that corresponds to the at least one piece of transmission information comprises:
   determining the power information corresponding to each piece of feedback information based on a transmission mode for transmitting the transmission information, wherein the transmission mode comprises:
   transmitting the transmission information using a beam, or transmitting the transmission information without using a beam; or,
   wherein the determining power information corresponding to each of at least one piece of feedback information that corresponds to the at least one piece of transmission information comprises:
   determining the power information corresponding to each piece of feedback information based on a transmission type of the at least one piece of transmission information; or,
   wherein the determining power information corresponding to each of at least one piece of feedback information that corresponds to the at least one piece of transmission information comprises:
   determining the power information corresponding to each piece of feedback information based on a physical sidelink feedback channel format corresponding to each piece of feedback information.

16. The non-transitory computer-readable storage medium according to claim 9, wherein the determining feedback information for which transmission needs to be dropped comprises:
   determining feedback information for which transmission needs to be dropped, until a quantity of feedback information for which transmission has not been dropped reaches a first quantity, wherein the first quantity is a quantity of simultaneously transmitted feedback information that can be supported by a transmit power of a transmitting device.

17. The non-transitory computer-readable storage medium according to claim 9, wherein before the transmitting corresponding feedback information on at least one physical sidelink feedback channel resource based on the power information corresponding to each piece of feedback information, the method further comprises:
   performing a logical operation on feedback information for one transmit end, to obtain a logical operation result of the feedback information for the one transmit end; and
   transmitting the logical operation result of the feedback information for the one transmit end on a predefined or preconfigured physical sidelink feedback channel resource.

18. The non-transitory computer-readable storage medium according to claim 9, wherein before the receiving at least one piece of transmission information transmitted on at least one physical sidelink channel, the method further comprises:

transmitting indication information to each transmit end, wherein the indication information is used to indicate a physical sidelink channel resource that is used for transmission by each transmit end.

\* \* \* \* \*